(12) United States Patent
Demir et al.

(10) Patent No.: US 6,847,886 B2
(45) Date of Patent: Jan. 25, 2005

(54) METHOD AND APPARATUS FOR FINDING A LOCATION IN A DIGITAL MAP

(75) Inventors: Cesim Demir, Aidlingen (DE); Ralf Hoffmann, Boeblingen (DE); Peter Hoyland, Sindelfingen (DE); Reiner Knapp, Holzgerlingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/209,976

(22) Filed: Aug. 2, 2002

(65) Prior Publication Data

US 2003/0083811 A1 May 1, 2003

(30) Foreign Application Priority Data

Aug. 3, 2001 (DE) .......................................... 101 37 632

(51) Int. Cl.⁷ ........................ G08G 1/123; G01C 21/30; G06F 165/00
(52) U.S. Cl. ........................ 701/208; 701/200; 340/988
(58) Field of Search ................................ 701/200, 208, 701/209, 201, 207, 213; 340/995.23, 988, 990, 995.24

(56) References Cited

U.S. PATENT DOCUMENTS

| 5,614,895 | A | * | 3/1997 | Ohomori et al. ............ 340/995 |
| 5,802,492 | A | * | 9/1998 | DeLorme et al. ........... 701/200 |
| 5,978,733 | A | * | 11/1999 | Deshimaru et al. ......... 701/209 |
| 6,067,499 | A | * | 5/2000 | Yogyu et al. ................ 701/201 |
| 6,072,409 | A | * | 6/2000 | Fushimi et al. ......... 340/995.19 |
| 6,341,254 | B1 | * | 1/2002 | Okude et al. ................ 701/208 |
| 6,346,893 | B1 | * | 2/2002 | Hirano et al. ................ 340/995 |
| 6,473,692 | B2 | * | 10/2002 | Hancock et al. ............ 701/208 |
| 6,567,743 | B1 | * | 5/2003 | Mueller et al. ............. 701/209 |
| 6,633,812 | B1 | * | 10/2003 | Martin et al. ............... 701/209 |

FOREIGN PATENT DOCUMENTS

| DE | 40 28 214 C2 | 9/1990 |
| DE | 19539367 | 4/1997 |
| DE | 197 50 786 C2 | 11/1997 |
| DE | 19750786 | 6/1998 |
| DE | 198 42 430 A1 | 9/1998 |
| DE | 199 17 546 A1 | 4/1999 |
| DE | 100 09 149 A1 | 2/2000 |
| DE | 19911676 | 6/2000 |
| EP | 0798540 | 10/1997 |
| EP | 1 020 832 A1 | 7/2000 |
| EP | 1028405 | 8/2000 |

* cited by examiner

Primary Examiner—Tan Q. Nguyen
Assistant Examiner—Dalena Tran
(74) Attorney, Agent, or Firm—Crowell & Moring LLP (57) ABSTRACT

A method for finding a desired location in a digital map whose locations are indicated with reference to a first coordinate system, includes the steps of determining a second coordinate system which is indicated with reference to the first coordinate system; determining coordinate data of the desired location with reference to the second coordinate system; finding the second coordinate system in the digital map; and finding the desired location in the first digital map by entering the coordinate data of the desired location in the second coordinate system.

19 Claims, 9 Drawing Sheets

| ORT:<br>lat: 9:17:54<br>long: 48:44:09<br>Alt: 485 m | 121 |

120

| Object Class:<br>1130 (Federal Highway) | 122 |

| Descriptive Information:<br>Bah (Bahnhof Street) | 123 |

| Transformed Location:<br>0226 (550 m Distance) | 124 |

| Side of Street:<br>1 (In the driving direction) | 125 |

| Object Class:<br>7160 (5-star Hotel) | 126 |

| Descriptive Information:<br>Int (Intercity Hotel) | 127 |

METHOD AND APPARATUS FOR FINDING A LOCATION IN A DIGITAL MAP

BACKGROUND AND SUMMARY OF THE INVENTION

This application claims the priority of German patent document No. 101 37 632.4, filed Aug. 3, 2001, the disclosure of which is expressly incorporated by reference herein.

The invention relates to a method and apparatus for finding a location in a digital map.

German Patent Document DE 197 50 786 C2 discloses a process and an apparatus of the generic type, for finding a location in a digital map. For this purpose, a map element that is to be found (comprising a location indicated in geographical coordinates, and additional information) is compared with map elements of the digital map stored in a reference data file, and the element to be found is determined by means of a plausibility check.

In European Patent Document EP 1 020 832 A1, a process is described for finding special map elements—objects—in a digital map. Objects are map elements indicated according to the, principles of object-oriented modeling and consist of a location and additional attributes. An object is precisely part of an object class, which may include several additional objects. For finding the object to be found, a search area is generated around its location. The object to be found is determined by the comparison of the attributes of the object to be found with the attributes of all objects of the search area which are part of the object class of the object to be found.

For the transmission of traffic information via RDS/TMC (Radio Data System/Traffic Message Channel) and its assignment to geographical locations, reference tables are used which assign a code to a location. The traffic messages are then transmitted together with the code and, in the vehicle, as a result of the assignment to a geographical location indicated in the reference table, are assigned to this location in the digital map. In this process, information can only be assigned to locations which exist together with a code in the reference table. The sender and the recipient must have the identical reference table available which simultaneously has to be updated. A code permits no conclusion concerning the geographical position of the location.

Another process for finding locations is the Global Telematics Standard (GATS). GATS was developed for the transmission of traffic information specifically in GSM networks. For the GATS process, GATS geocodes are defined which are comparable to the codes from the RDS/TMC. The GATS process also operates in a table-oriented manner. The tables of the GATS process can be updated "in the continuous operation", and the GATS geocode permits conclusions concerning the position of the map element to be found. The number of map elements which can be found is limited by the geocode coordinate system. On the sender side, the tables have to be regularly updated and the GATS geocodes of the map elements have to be partially automatically coupled with the objects of the digital maps. So far, GATS geocodes have been defined only in Germany.

Normally, locations on digital maps are indicated in geographical coordinates, thus in longitudinal and latitudinal data. The indication of geographical coordinates, however, may not be precise enough under certain circumstances because map elements, such as street intersections, junctions, etc. may be assigned to different locations on different digital maps, which may also change, for example, when the map is updated.

One object of the invention is to provide a method and apparatus of the initially mentioned type, in which a location can be found in a precise manner in a digital map.

This and other objects and advantages are achieved by the process according to the invention, in which a second coordinate system is defined and the coordinate data for the location to be found are determined in the second coordinate system. The second coordinate system is then located in the digital map; the coordinate data of the location to be found is entered in the second coordinate system, so that the location is therefore found in the digital map. By a suitable selection of the second coordinate system, certain error sources can be avoided when finding the location because, for example, systematic errors of the map, such as an offset of the map as a whole, can be compensated. In addition, the information can be transmitted in a compact manner with respect to a limited transmission medium and is generic, that is, relates only to map contents and is independent of other codes or defined data models or structures.

The second coordinate system is suitably defined by a point of reference, specifically the origin of the coordinate system, and additional information.

In a further embodiment of the process, additional information is stored relative to the locations in the digital map. This information comprises streets, intersections, road types, bridges, hotels, sights, restaurants, banks, gas stations, etc. Map elements comprise locations and additional information.

The process can be implemented advantageously in that the second coordinate system is defined by a map element. The location of the map element of the digital map is then selected as the point of reference of the additional coordinate system, and additional information of the map element defines the remainder of the coordinate system. Ideally, a map element is selected in this case which represents an essential element for the purpose-related utilization of the map, and which relates to the map element to be found. In this case it can be assumed (with high probability) that the map element whose locations form the point of reference already exists in the digital map.

Advantageously, the locations to be found are stored in a table and/or another digital map. In the table and/or the additional digital map, the location is determined which is to be found in the digital map. An implementation possibly consists of storing the locations stored in the table and/or the additional digital map already in the second coordinate system, in which case, each location, relative to a defined second coordinate system may be stored with a certain second point of reference, or all locations may be stored relative to the same second coordinate system. Another possible implementation consists of only, during the selection of a location in the table and/or the additional digital map, transforming this location correspondingly into an advantageous second coordinate system.

Another advantageous embodiment of the process is used if the map element, which defines the second coordinate system, is not present in the map. In this case, the map element, which forms the second coordinate system, is transferred from the additional digital map into the digital map. Thus, it can be ensured that the second coordinate system is always present in the digital map.

In an advantageous further embodiment, for finding map elements, the additional information of the map element is compared. In this case, a location of interest to the user or a map element of interest to the user can be determined in the table and/or the additional digital map, and can then be found in the digital map. For example, when the user searches for a hotel; one or more locations with the additional hotel information is determined in the table and/or in the additional digital map. When it is found in the digital map, it is optionally provided with the up-to-date information of the map element from the table and/or the additional digital maps. It may also be processed, for example, visually highlighted. It is advantageous to proceed in the same manner when in step c) the search takes place for the map element which forms the second coordinate system.

An advantageous embodiment of the invention also permits the assignment of map elements in the digital map which were previously absent in the digital map. For this purpose, the map element in question is searched in the digital map. If it is found, it is, for example, supplemented, updated, visually highlighted or processed in a different suitable manner. If, however, it is not found in the digital map, it is transferred from the additional digital map to the digital map and is stored there. This permits the interaction of digital maps of different production dates, different relevances and mainly the assignment of dynamic map elements which are present only temporarily, for example, events, such as concerts, festivals or traffic jams.

In addition, it is advantageous to use the found location or the found map element as a destination or intermediate destination for a navigation system. Thus, the navigation system can carry out a route computation to the found location or the found map element, and the user has the increased comfort that he obtains a routing to the destination or the intermediate destination and does not have to find the route himself, possibly in an unfamiliar environment.

If the additional coordinate system is selected to be one-dimensional, the location to be found can be found by indicating a single coordinate. In addition to the coordinate, the one-dimensional reference coordinate system has to be indicated, whose location and additional information (for example, the direction) will then be the defining elements of the additional coordinate system. In this manner, by indicating compact information which, when transmitted by way of a medium with a low transmission capacity, is to be transmitted in a rapid and low-cost manner, a location can be found precisely in a digital map.

Advantageously, the additional one-dimensional coordinate system is defined by a map element. Two-dimensional map elements, such as edges, are particularly useful because, by their nature, edges have a location and a direction which then become the determining elements of the additional coordinate system. On digital maps used for the purpose of navigation, roads are represented as edges and intersections are represented as nodes. Thus, for these digital maps, edges are an essential element of the utilization purpose because a route is constructed from them, which leads a vehicle to a defined destination.

This results in another particularly advantageous embodiment of the invention. If the edge, which is the defining map element of the additional coordinate system, is selected such that it is situated on a calculated route of a vehicle, it is also certain to exist in the digital map, or has been transferred there in the course of the route computation. Thus, it is ensured that the additional coordinate system refers to a known relevant map system which is present in the digital map without any additional expenditures. It neither has to be specially generated for the additional coordinate system, nor is it superfluous in the digital map because it is required for its intended purpose, which is the routing.

Furthermore, the selection of an edge as a defining element of the additional coordinate system has the advantage that the edge can be selected such that the location to be found can be reached by way of this edge. Thus, in addition to the information concerning the location to be found, information is also available as to how such location can be reached. This is particularly advantageous when used in connection with a navigation system, because its facilitates the computation of the route to the location to be found as a destination or as an intermediate destination.

For a more precise finding of the location in the digital map, in a possible improved embodiment of the process, a search area can be performed around the approximate location, for the matching locations. When searching for the map elements, the additional information concerning the map elements in the search area is compared for this purpose with the additional information of the map element that is to be found and, in the case of a conformity or a high degree of conformity, the decision is made that the searched element was found.

By using an object-oriented data model to indicate the map elements, the advantages of the object orientation, such as the flexibility, clear structuring, defined interfaces, reusability, openness for expansions, etc. can be utilized. In this case, an object which represents a map element consists of a location and additional attributes. An object that is exactly part of an object class can consist of several additional objects.

For finding an object in a search area of the digital map, attributes of the objects which are situated in the search area and belong to the same class as the object that is to be found are compared with the attributes of the object to be found and, in the case of a conformity of the attributes or of a high degree of conformity, the object to be found is thereby determined.

The system according to the invention comprises a first memory for storing the digital map, a second memory for storing the table and/or the second digital map, and at least one processor for implementing the process according to the invention. The first memory is arranged in a vehicle and the digital map stored therein is used also for other purposes, particularly for navigation and for displaying the map in the vehicle. The system also comprises a user interface which can be constructed visually and/or acoustically. As a result of the visual user interface, the map can, for example, be displayed for the purpose of navigation and/or the user can operate the system by destination inputs, by means of desired intermediate destinations and/or desired destination or intermediate destination categories.

In an embodiment of the invention, the second memory may be arranged in the vehicle. It may, for example, be a portable removable storage element with current data which the user brings with him into the vehicle and uses in connection with the first memory in the vehicle (and particularly in connection with the navigation system existing in the vehicle). The user has, for example, purchased the storage medium beforehand, for example, in preparation for a trip, or he has downloaded the current data from another medium, such as the Internet. This embodiment is operable also without a control center, without communication devices and thus without any infrastructure, which permits a design of the system which is reasonable in price.

Particularly advantageously, the system can be supplemented by the interaction of the vehicle-side system and a control center because current data can always be requested by the control center, and changed travel plans can also be taken into account. The communication with the control center takes place by communication devices.

In an embodiment of the system, maneuvering information of the navigation system is emitted by way of the visual and/or acoustic user interface in the vehicle. It is possible for the route computation to take place in the vehicle, which permits autonomous operation of the vehicle system. Route computation in the control center, on the other hand, has the advantage that the most current data are always available in the control center, on the basis of which the route can then be calculated. When, for example, the control center is overloaded, so that communication is not possible, etc., autonomous operation of the vehicle-side system is most advantageous. If the digital map in the vehicle is outdated, it is recommended that the route computation be carried out on the basis of the current data in the control center. The determination as to whether the computation of the route should take place in the control center or in the vehicle, or partially in the vehicle and partially in the control center can be made dynamically according to the situation, taking into account marginal conditions. This may take place, for example, when the communication connection to the control panel ceases.

Other objects, advantages and novel features of the present invention will become apparent from the following detailed description of the invention when considered in conjunction with the accompanying drawings.

DETAILED DESCRIPTION OF THE INVENTION

Figure 1:
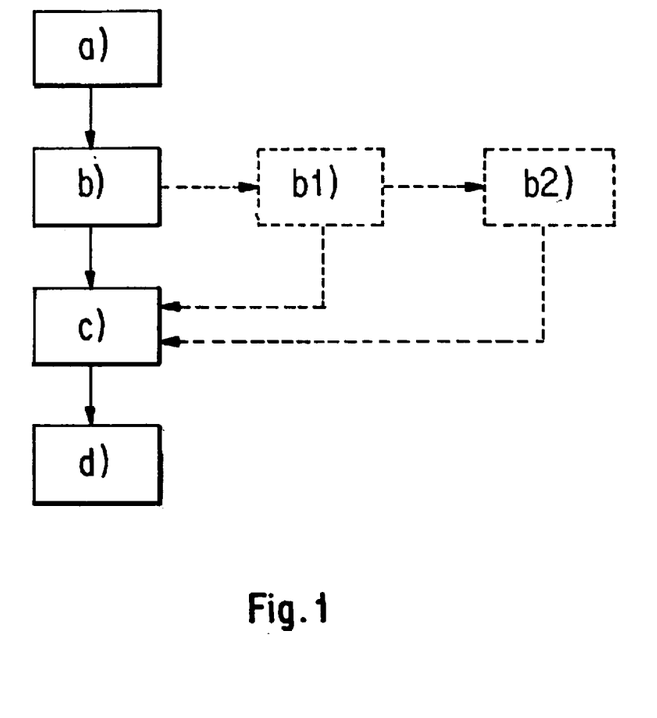
FIG. 1 is a flow chart of the process according to the invention.
Figure 2:
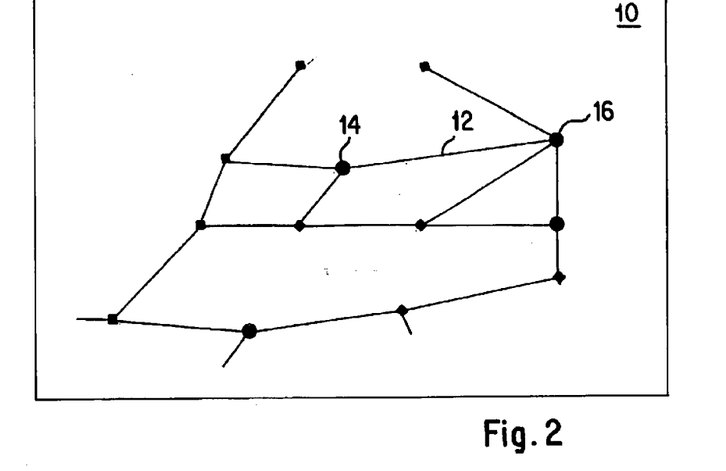
FIG. 2 is a schematic view of a digital map with nodes and edges.

The process according to the invention is illustrated in the flow chart in FIG. 1 and a schematically depicted digital map in FIG. 2. A location 20 (FIG. 3) is to be found in the digital map by means of the edge 12 extending between the nodes 14 and 16. Reference number 14 is defined as the starting point of the edge 12, and reference number 16 is the end point. The location 20 is not indicated directly in geocoordinates—degrees longitude and latitude.

Figure 3:
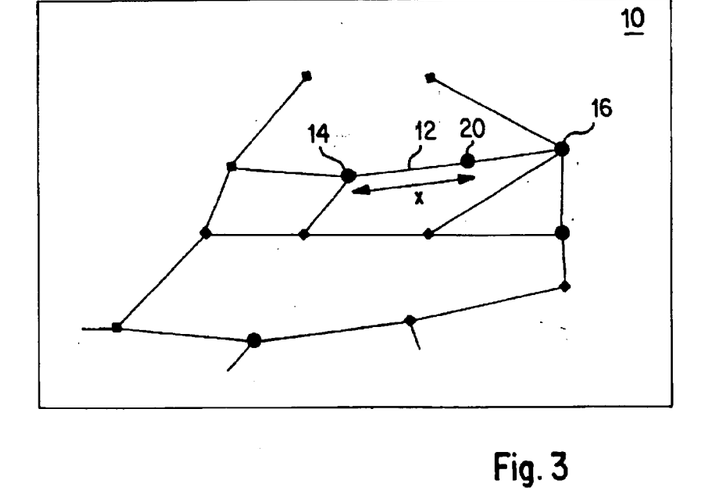
FIG. 3 is a schematic view of a digital map with nodes and edges, and a found location.

Referring to FIG. 1, a second coordinate system is defined in step a) of the process. In the example, the edge 12 is defined as the second coordinate system. The second coordinate system therefore corresponds to a one-dimensional coordinate system with the reference point 14, extending in the same direction as the edge 12. The coordinate data of the location 20 to be found in the second coordinate system is indicated in step b) as "x meters". It is therefore situated at a distance of x meters from the starting point 14 of the edge. In step c), the second coordinate system (the edge 12) is found in the digital map; and in step d), the coordinates are plotted off. In FIG. 3, the location 20 to be found will then be entered, specifically x meters away from reference point 14 of the one-dimensional coordinate system, which is the edge 12. The process steps illustrated by a broken line in FIG. 1 represent advantageous further developments of the process which will be explained by means of the following embodiments.

Figure 4:
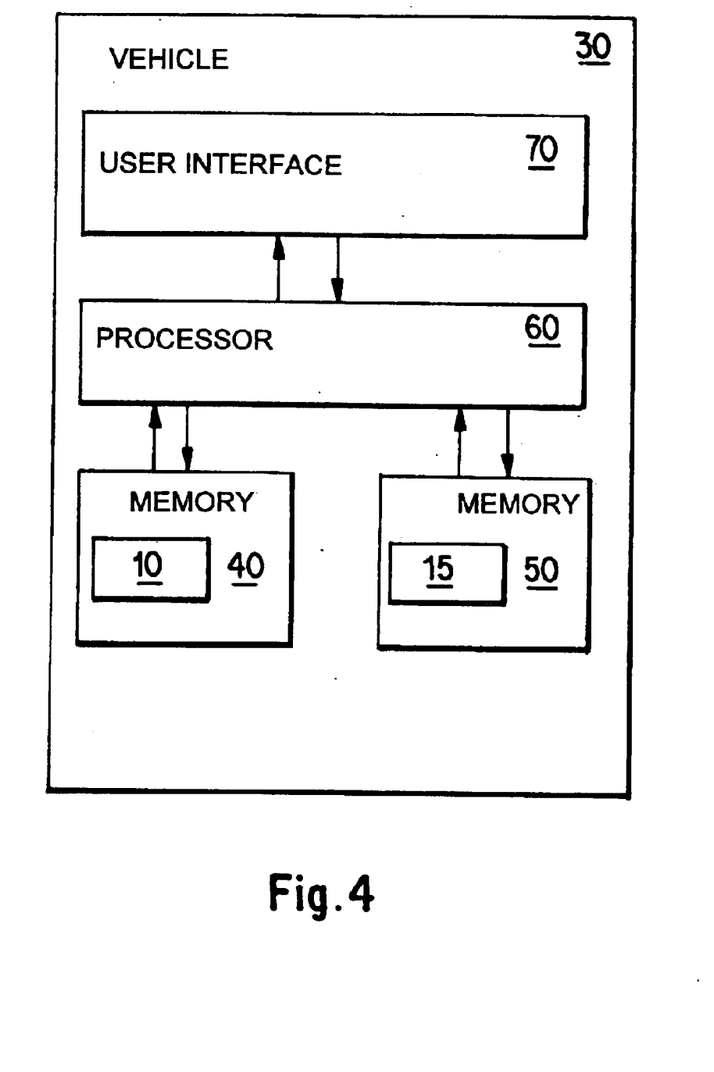
FIG. 4 is a conceptual block diagram of a vehicle-autonomous system.

FIG. 4 is a conceptual block diagram of a vehicle-autonomous system having a memory 40 in which the digital map 10 is stored; a second memory 50 in which the locations to be found are stored in a table or in another digital map; a processor 60, and a user interface 70. Here, the user puts in criteria by way of the user interface 70 for a desired destination or intermediate destination; a search takes place in the digital map 15 or table stored in the memory 50 for a location which corresponds to the criteria. This location is now the location to be found in the digital map 10 which is stored in the memory 40. The location is found according to the process of the invention. Then the location is marked in the digital map 10 by way of the user interface 70 by which the digital map 10 is displayed, is displayed, and is used as a destination or intermediate destination for calculating the route.

Figure 5:
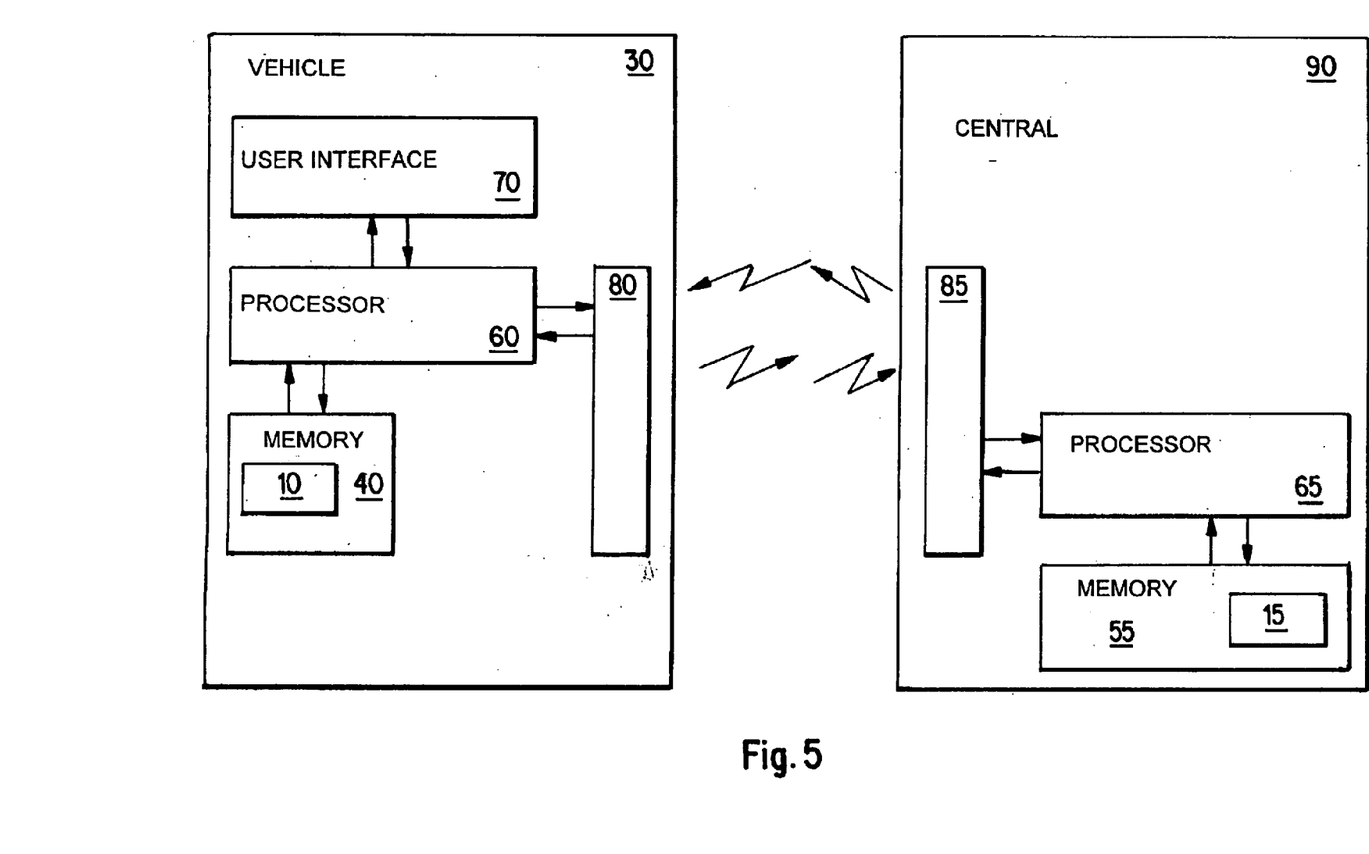
FIG. 5 is a conceptual block diagram of a system with a control center.

FIG. 5 is a schematic overview of the system in the vehicle 30 with the processor 60, the memory 40 with the digital map 10, the user interface 70, and a communication device 80. By way of the communication devices 80 and 85, the vehicle system communicates with a system in a control center 90 which comprises a processor 65 and a memory 55, in which another digital map 15 is stored. By way of the communication devices 80 and 85, the criteria of the user for a destination or intermediate destination are transmitted to the control center 90. Locations and/or map elements are selected in the digital map 15 corresponding to the criteria and are transmitted to the vehicle 30. There, the locations and/or map elements are found and processed according to the process of the invention by means of the locations and/or map elements in the digital map 10.

Figure 6:
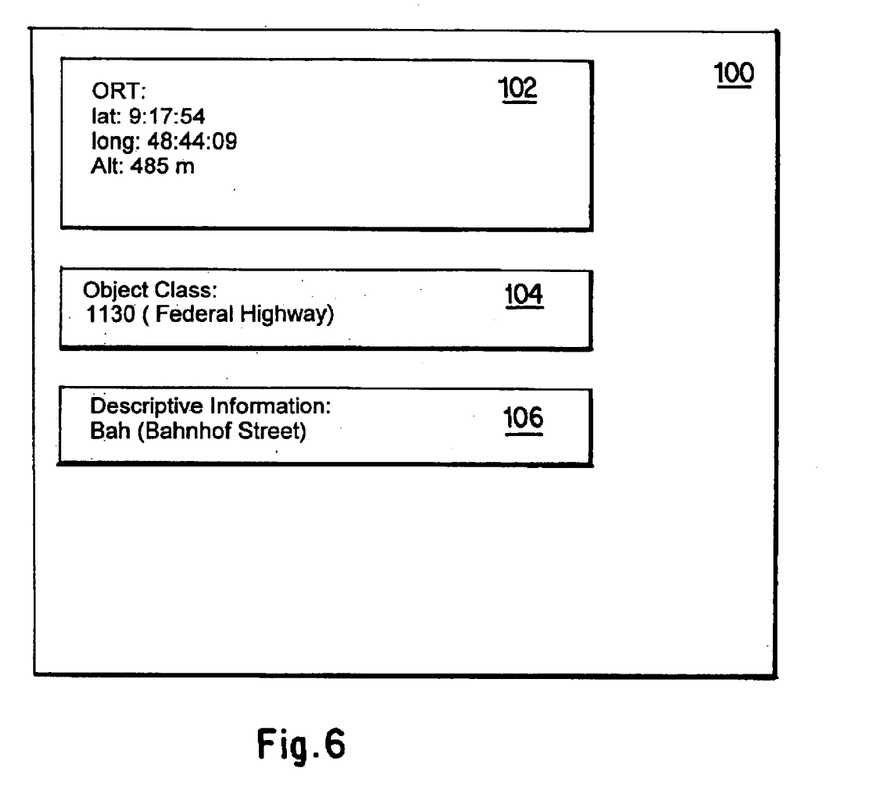
FIG. 6 shows a map element represented as an object on the example of an edge serving as the reference system.

FIG. 6 shows the construction of a map element displayed as an object, based on the example of an edge which constitutes the second coordinate system. In this case, the location 102 of the map element is the starting point of the edge. For example, the southernmost point or the westernmost point of the edge is assumed to be the starting point. In the case of one-dimensional elements, the location of the map element corresponds to the location of the object. In the case of three-dimensional objects, for example, the southernmost point of the object is taken as the location. As an alternative, it is also possible to select, in the case of multi-dimensional map elements, for example, the center of gravity of the line or surface as the location. The altitude indicates the altitude of the edge above sea level (NN). If the altitude information for an edge is not available, this value can be filled, for example, by the hexadecimal value "FFF" in order to indicate that the altitude information is not available. In the present example, the object class 104 indicates a federal highway, and the descriptive information 106 identifies the present object in this example as "Bahnhof" Street.

Figure 7:
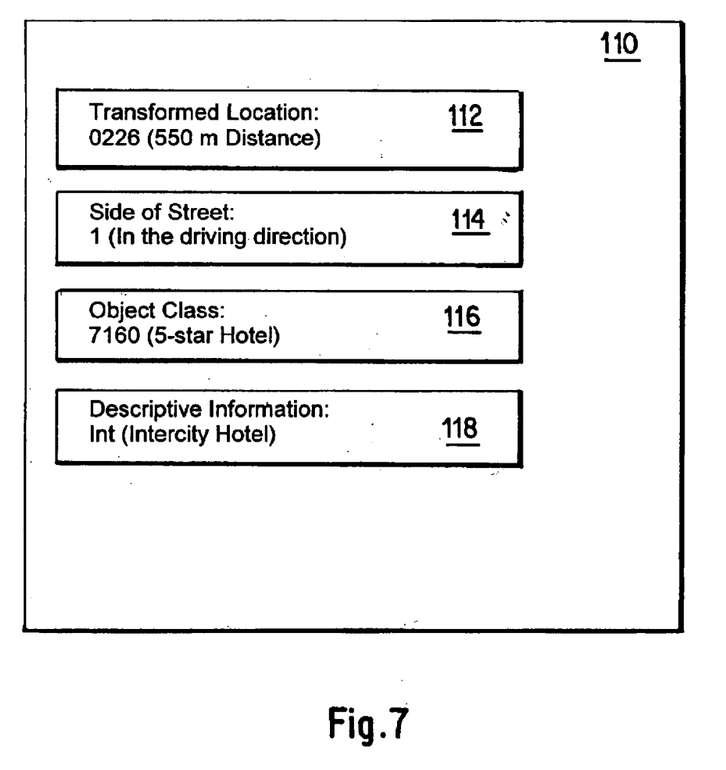
FIG. 7 illustrates a data structure for an object that is to be found, in a transformed form.

In FIG. 7, an object 105 to be found in the digital map 110 is illustrated in a transformed form. The transformed location 112 indicates the distance to the reference point of the new coordinate system. In order to find the object 110 in the digital map 10, therefore, in addition to the object 110, the object which defines the new coordinate system must also be indicated. In the example, this would be the object 100 from FIG. 6. Object 110 can be reached by way of the edge which is defined by the object 100.

Figure 8:
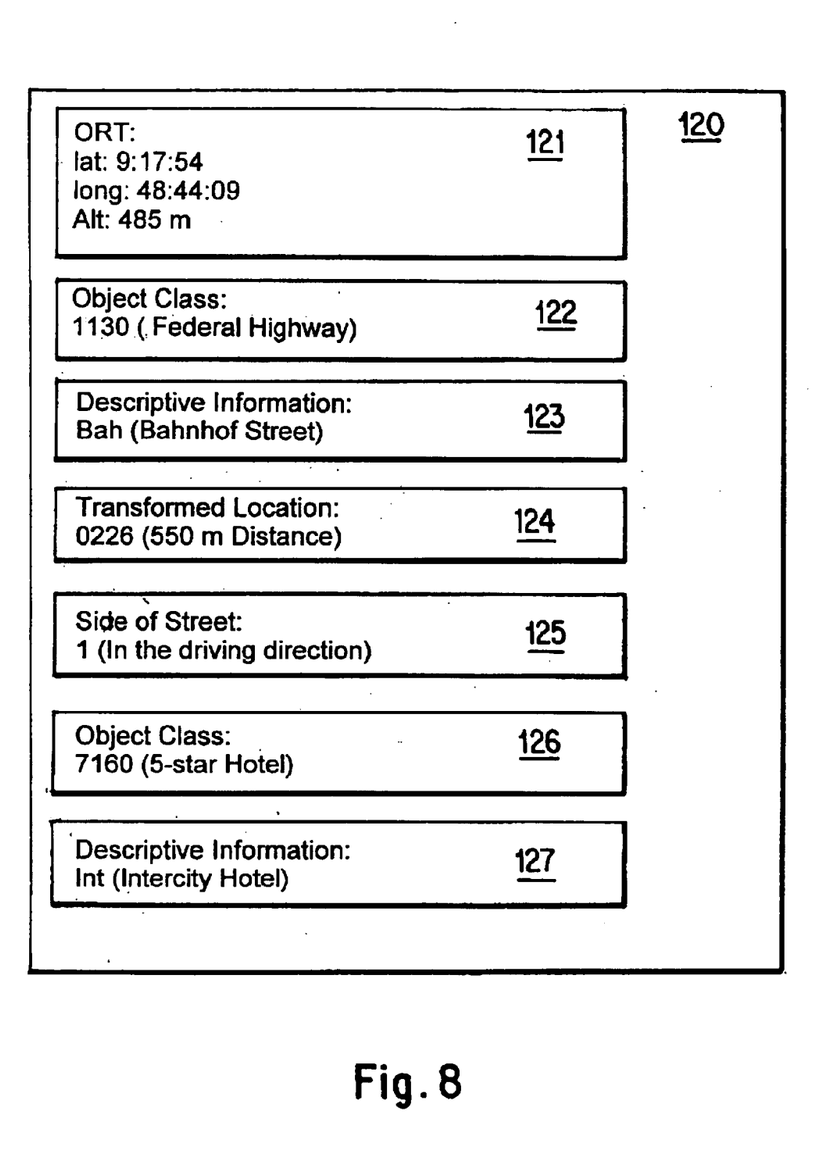
FIG. 8 is a view of a constructed of an object that is to the found, with a reference system.

For the system described by means of FIG. 5, this means that the control center 90 transmits the object 100 together with the object 110 in the form of the object 120 from FIG. 8 to the vehicle 30, and by means of this information, the object 110 is found in the digital map 10 by means of the process according to the invention.

The transformed location information 112 therefore indicates the distance from the starting point 102 of the edge defined by object 100. From this point 102, the position of each object on the edge 110 can be unambiguously described by means of a one-dimensional quantity, specifically the distance 112, independently of the type of representation (polygonal course, splines) of the edges on the digital map 10. By means of the distance 112, the position of the object 110 to be found is described unambiguously. For example, that point of the edge which has the lower house number can be assumed to be the starting point 102 of the edge.

In order to now obtain a general unambiguity of the object to the found, the street side 114, object class 116 and descriptive information 118 are added. The object class 116 permits masking of objects of other classes in the surroundings of the object to be found in order to reduce the number of objects for the final selection. The descriptive information 118 permits the masking of other objects which are part of the same object class 116. The street side 114 information finally permits the assignment of the object to a certain street side (for buildings) or to a driving direction (for traffic events) in order to arrive from the right direction of a street when, for example, the two driving directions are separated from one another by crash barriers or the like. This can be indicated, for example, by a 1-bit value. "1" would then, for example, mean "from the starting point in the driving direction", and "0" would mean "from the starting point against the driving direction" (that is, on the opposite side of the street). Thus, movable objects can also be unambiguously indicated with respect to the pertaining street edge.

In FIG. 8, the transformed object 120 to be found is again illustrated with its reference coordinate system. Corresponding to this schematic construction, the object to be found will be transmitted from the control center to the vehicle. The object with its reference system specifically consists of the indication of the location of the reference edge 121, with the object class of the reference edge 122, the descriptive information of the reference edge 123, the location of the object 124 with respect to the reference edge, the indication of the side 125 of the street, of the object class 126 and of the descriptive information 127 of the object.

To find the object 120 in the digital map, a search area is generated whose center point is defined by the indication of the longitude and latitude of the location 121. In this case, half the diagonal of the square search area is larger than the transformed location 124. For finding the reference edge, only those object will then be considered inside this square which belong to the same object class 122 as the reference edge. The descriptive information 123 has the purpose of determining the corresponding edge from among the edges which belong to the same object class. The height has the purpose of differentiating, in the case of several street sections with the same descriptive information, between mutually crossing tracks. Since, the transformed location 121 and the side 125 of the street of the object to be found are also known, a route can be calculated to this object 120 or this object can also be taken into account when calculating the route, for example, in the case of traffic events.

It is possible that the object 120 may not be present on the digital map 10 because, as a rule, the control-center-side digital map 15 is updated much more frequently than the vehicle-side digital map 10. If the object 120 to be found is not in the digital map, with the aid of corresponding information (for example, the release number of the digital map 10), the difference between digital map 10 and digital map 15 is determined at the control center side and is sent into the vehicle. For this purpose, the received difference is combined in the vehicle with the digital map 10 so that the received map data together with the original digital map 10 result in a navigable map base. Advantageously, the information concerning the digital map 10 is sent to the control center during the user's inquiry concerning an object to be found as a destination or intermediate destination together with the inquiry or in a separate block.

By means of the information concerning the digital map 10, it can be determined in the control center 90 whether the edge 100, which is used as the reference system, is contained in the map base 10. (This takes place in step b1) in FIG. 1.) If so (that is, the object 100 is also contained in the digital map 10), only the object information of the object 120 is transmitted to the vehicle. Otherwise (when the edge 100 is not contained in the map 10), the control center 90 generates a corresponding map window with the required/necessary detailing and sends this information into the vehicle 30. This takes place in step c2) of FIG. 1. Subsequently, the control center 90 will send the object information 120.

In the vehicle 30, the received map data are combined with the existing map base 10 so that a navigable map base is generated in the vehicle 30. In this case, the map window may, for example, consist of maneuvering points/maneuvering information whose starting point must be contained in the map data bank 10 existing in the vehicle 30 in order to combine the received and the existing map data. However, "real" map information may also be transmitted in the form of detailed map information.

Examples of object classes are indicated in the following table:

| Object Cl. | Description Plane 1 | Description Plane 2 | Description Plane 3 | Description Plane 4 |
|---|---|---|---|---|
| 1000 | Roads & Ferries | | | |
| 1100 | | Road Elements | | |
| 1110 | | | Europa Highway (E) | |
| 1120 | | | Autobahn (A) | |
| 1130 | | | Federal Highway (B) | |
| 1140 | | | Road | |
| 1141 | | | | State Road (L) |
| 1142 | | | | County Road (K) |
| 1143 | | | | Connection |
| 1144 | | | | Residential Street |
| 1145 | | | | Private |
| 1146 | | | | Pedestrian Path |
| 1147 | | | | Approach Road |

-continued

| Object Cl. | Description Plane 1 | Description Plane 2 | Description Plane 3 | Description Plane 4 |
|---|---|---|---|---|
| 1200 | | Ferries | | |
| ... | | | | |
| 3000 | Traffic Events | | | |
| 3100 | | Accidents | | |
| 3110 | | | Collisions | |
| 3111 | | | | ... |
| 3120 | | | Roadside Accidents | |
| 3200 | | Traffic Jams | | |
| 3300 | | Construction Sites | | |
| ... | | | | |
| 4000 | Traffic Events | | | |
| 5000 | Police/Fire Dept./ Physicians/ Hospitals | | | |
| 6000 | Sights | | | |
| 7000 | Hotels/ Restaurants/ Bars | | | |
| 8000 | Banks/ Businesses | | | |
| 7100 | | Hotels & Guest Houses | | |
| 7110 | | | Guest Houses | |
| 7111 | | | | ... |
| 7120 | | | 1* Hotels | |
| 7130 | | | 2* Hotels | |
| 7160 | | | 5* Hotels | |
| 7170 | | | Apartments | |
| 7200 | | Restaurants | | |
| 7300 | | Bars | | |
| ... | | | | |
| 8000 | Others Events | | | |
| ... | | | | |

To determine the distance of the object 110 from the reference point of the object 100, the difference between the two geocoordinates of the locations of object 110 and object 100 can be calculated with the aid of the digital map 15.

Figure 9:
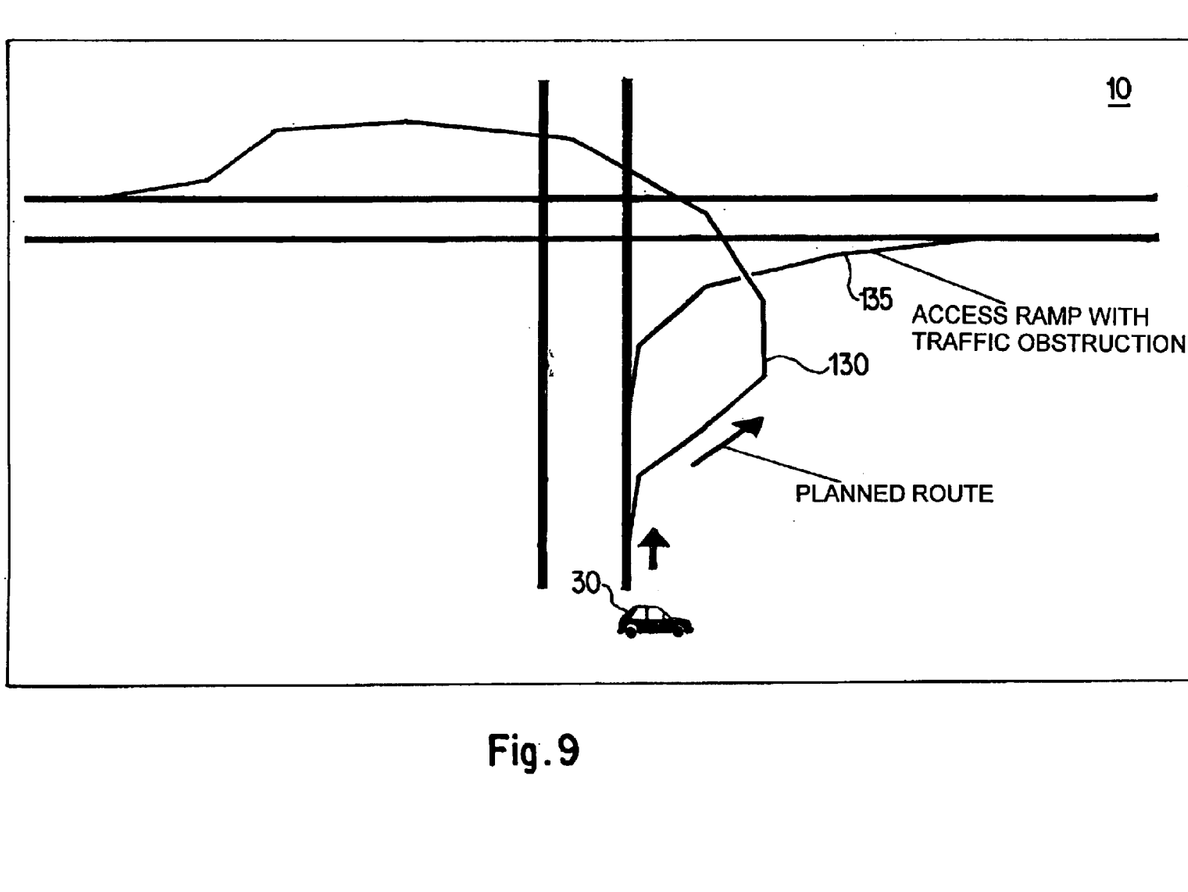
FIG. 9 is the map display of a highway interchange in the form of a cloverleaf.
Figure 10:
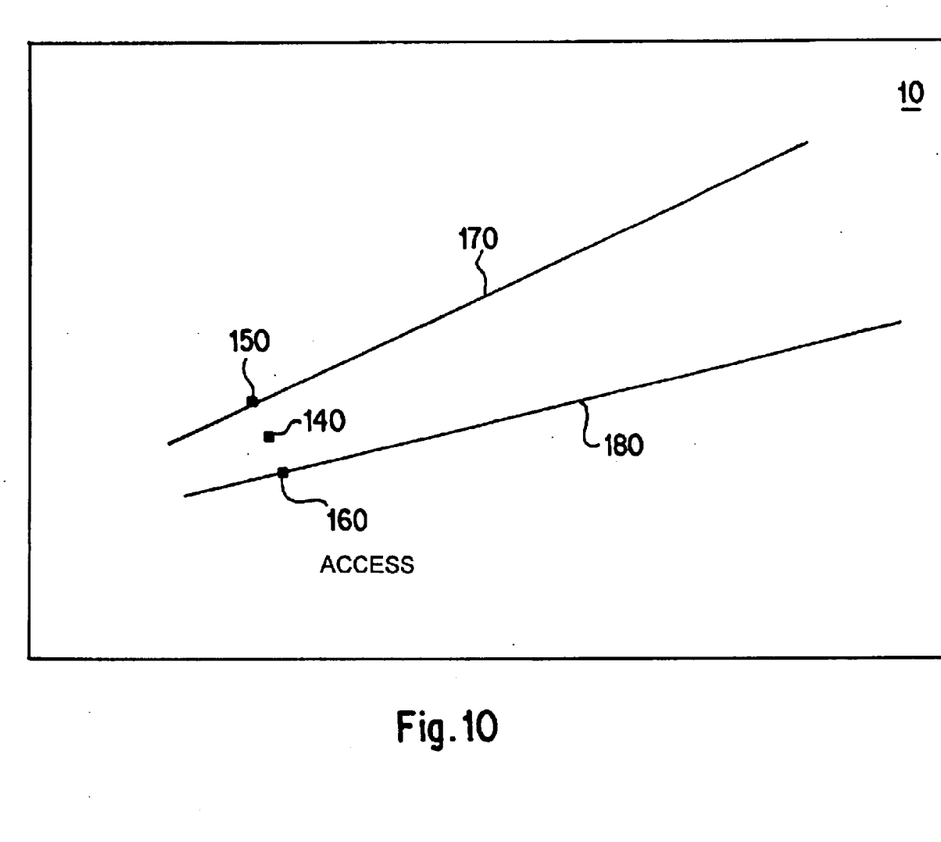
FIG. 10 is a view of an object with an access via an edge.

FIGS. 9 and 10 illustrate additional advantages of the invention. First, it is possible to find objects which are three-dimensional, for example, mutually overlapping entry/exit ramps of highway cloverleaves which are part of the same edge or the same highway section.

Furthermore, it is possible to find building numbers, or the precise position of an object on an edge, the correct side of the street or the driving direction of the object. Objects can also be found which, although they exist on map 15, do not exist on map 10, such as dynamic objects, differences because of different map bases, differences because of different manufacturing dates, etc.

FIG. 9 shows the map representation of a roadway cloverleaf as such an example. Because, the two access ramps 130 and 135 have the same descriptive information, in the event of a traffic jam on only one of the two ramps, it cannot be determined in the vehicle 30, on which of the two ramps the hindrance is present. Another example would be if an object were to be found at the intersection of two roads with similar names (for example, Ulmer Street, Ulmer Alley). In this case, no distinction can be made between the two objects without any height information. The process permits the finding of these objects in the map 10, and thereby further processing of the objects as destinations or intermediate destinations for an onboard navigation. This optimizes the interaction between an onboard navigation system and the control center 90.

Dynamic objects are those which are bound to a locality, such as town festivals, those which represent locally bound traffic disturbances (for example, an accident, a construction site) and those which represent slow-moving objects, such as traffic jams. The position indication for traffic disturbances of any kind is currently very poorly defined. However, by means of the current assignment methods, for example, the TMC, this poor definition is still increased. The process according to the invention takes into account that the position indication for traffic disturbances will become more precise in the future and that then, by means of the present process, the precise position can also be transmitted from the control center 90 to the vehicle 30. It is also advantageous that a single object class catalog contains all objects of a digital map 10 or 15. No difference exists as to whether an object is an object to be found or a navigation-relevant object. This eliminates the double expenditures of generating two separate object class catalogues. In addition, optimized operation of the two processors 60 and 65 is achieved. Another advantage of the system consists of the fact that, together with the object 110 to be found, the edge 100 by way of which the object to be found can be approached, can simultaneously be transmitted so that the interaction with the navigation is further improved. The use in the navigation system can take place without any high-expenditure editing, which makes possible an optimal guiding to the destination object.

FIG. 10 illustrates an example in which an object to be found is situated on an edge which is not present in the digital map 10. When a route is calculated to a found object which was transmitted without the pertaining edge, the navigation system will take the edge on which the object is situated in the digital map 10. However, the object is not necessarily situated on the correct edge in the digital map 10. It is possible that the object 140 may be situated between two edges 170 and 180. It is assumed that, in the example of FIG. 10, access 160 to the object 140 is possible by way of the edge 180. Since the edge by way of which access to the object 140 is possible was not also transmitted to the navigation system, the navigation system may assign the access 150 by way of the edge 170 to the object 140. In reality, no access is possible there. However, from the data present in the digital map, it was not possible for the navigation system to determine the correct access. The process according to the invention provides the remedy of also transmitting, along with the object 140 to be found, the edge by way of which the object can be reached. In the present example, the edge 180 would then be transmitted along with the object 140, and the route is therefore calculated by way of the edge 180.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for finding a desired location in a first digital map in which locations are indicated with reference to a first coordinate system, said method comprising:
 defining a second coordinate system by reference to a reference map element comprising location information and additional attribute information characterizing said reference map element;

determining coordinate data of the desired location with reference to the second coordinate system;

defining a search area in said first digital map based on said location information of said reference map element;

searching for said reference map element within said search area by comparing said additional attribute information of said reference map element with attribute information for map elements within said search area;

determining a location of said reference map element in said first digital map based on a result of said search; and finding the desired location in the first digital map based on the coordinate data of the desired location with reference to the second coordinate system, and the location of the reference map element in the digital map.

2. The method according to claim 1, wherein:
a reference point of the second coordinate system is defined to be the location of the reference map element.

3. The method according to claim 1, wherein respective desired locations are stored in one of a table and a second digital map.

4. The method according to claim 3 wherein in said searching step, it is determined whether the reference map element is present in the first digital map and, if not, the reference map element is transmitted to the first digital map, and is stored there.

5. The method according to claim 3, wherein if it is determined that the reference map element to is not present in the digital map, the reference map element is transmitted from the table or from the second digital map to the first digital map, and is stored there.

6. The method according to claim 1, wherein a reference map element can also be found by:
checking whether map elements are situated at or near a location of the reference map element;
comparing selected additional attribute information of the reference map element with attribute information of map elements which are situated in the digital map at or near the location of the map element.

7. The method according to claim 1, wherein the desired location or reference map element is used as one of a final destination and an intermediate destination for a route computation.

8. The method according to claim 1, wherein the second coordinate system is one-dimensional.

9. The method according to claim 8, wherein the reference map element is an edge.

10. The method according to claim 9, wherein the edge is situated on a computed route for a vehicle.

11. The method according to claim 9, wherein the desired location or reference map element can be reached via the edge.

12. The method according to claim 1, wherein:
map elements are indicated as objects.

13. The method according to claim 12, wherein attributes of objects are used to determine a desired object to be found among objects of the same class in the search area.

14. A system comprising:
a first memory for storing a first digital map;
a second memory for storing an additional digital map or a table;
at least one processor; and
a user interface wherein:
at least one of the first memory, the at least one processor and the user interface are arranged in a vehicle; and
the at least one processor is programmed to find a desired location in the first digital map, in which locations are indicated with reference to a first coordinate system, by
defining a second coordinate system by reference to a reference map element comprising location information and additional attribute information characterizing said reference map element;
determining coordinate data of the desired location with reference to the second coordinate system;
defining a search area in said first digital map based on said location information of said reference map element;
searching said reference map element within said search area by comparing said additional attribute information of said reference map element with attribute information for map elements within said search area;
determining a location of said reference map element in said first digital map based on a result of said search; and
finding the desired location in the first digital map based on the coordinate data of the desired location with reference to the second coordinate system, and the location of the reference map element in the first digital map.

15. The system according to claim 14, wherein the vehicle also includes communication devices.

16. The system according to claim 14, wherein the second memory is arranged in one of the vehicle and a control center.

17. The system according to claim 16, wherein:
a route computation takes place in one of the vehicle and the control center; and
maneuvering information is conveyed via the user interface.

18. A method for finding a desired location in a digital map, comprising:
selecting a reference map element in proximity to said desired location;
defining a first object comprising location information and first additional attribute information characterizing said reference map element;
defining a second object comprising transformed position information of said desired location relative to said reference map element and second additional attribute information characterizing said desired location, including an object class;
defining a transformed object comprising the first and second objects;
identifying a search area in said digital map as a function of position information included in said transformed object;
searching for said transformed object in said digital map by comparing said first and second additional attribute information with attribute information for objects within the search area; and
determining a location of said transformed object in said digital map based on a result of said searching step.

19. The method according to claim 18, wherein said searching step is limited to consideration of objects of the same class specified in said second object.

* * * * *